May 29, 1951   D. M. MORGENSTERN   2,555,239
SWIVEL JOINT FOR CONNECTING THE HEAD
OF REAR VIEW MIRRORS TO ITS SUPPORTS
Filed March 16, 1950

INVENTOR.
DAVID M. MORGENSTERN
BY West & Oldham
ATTORNEYS

Patented May 29, 1951

2,555,239

UNITED STATES PATENT OFFICE 2,555,239

SWIVEL JOINT FOR CONNECTING THE HEAD OF A REARVIEW MIRROR TO ITS SUPPORT

David M. Morgenstern, Cleveland, Ohio, assignor to Nelmor Corporation, Chicago, Ill., a corporation of Illinois Application March 16, 1950, Serial No. 150,064

11 Claims. (Cl. 287—23)

This invention is an improved swivel joint for connecting the head of a rear view mirror to a supporting arm or bracket.

As is generally known, mirrors of the kind referred to are used on motor vehicles for informing the drivers of traffic conditions to the rear of their vehicles. For various reasons it is necessary or desirable to change the angle of the mirror rather frequently, as in cases where different drivers or members of a family operate the same vehicle from time to time.

It is a purpose of my invention to provide a very simple, durable and inexpensive swivel joint connection between the mirror head and supporting arm or bracket that frictionally and very firmly holds the mirror in any position of adjustment; that is smooth of action, and that is quick and easy of adjustment.

Other objects of my invention are to provide a joint of the character aforesaid, comprising a minimum number of parts that are especially convenient of assembly and are capable of being permanently connected together with equal facility; to provide a joint of this nature that is practically immune from disorder, and to provide such a joint wherein a uniform friction prevails indefinitely.

Immunity from disorder and the permanency of the frictional quality of the joint are especially important for the reason that the joint is inaccessible after the complete structure, including the mirror head and supporting arm or bracket, are once assembled and connected together in the process of manufacture.

The foregoing objects and advantages, with others hereinafter appearing, are attained in the embodiments of the invention illustrated in the accompanying drawing; and while I shall proceed to describe these embodiments in detail, it will be understood that the invention is not accordingly limited, but is susceptible to such changes and modifications as fall within the scope of the claims appended hereto.

Figure 1:
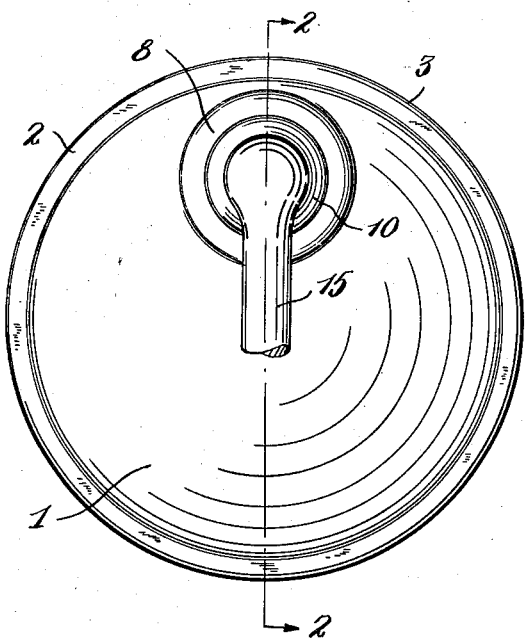
Figure 2:
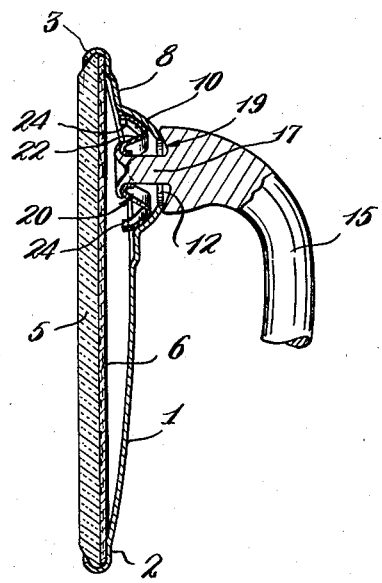
Figure 3:
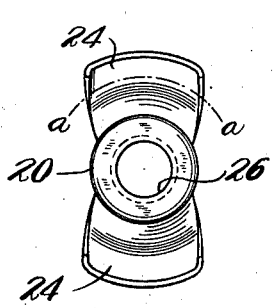
Figures 5, 6:
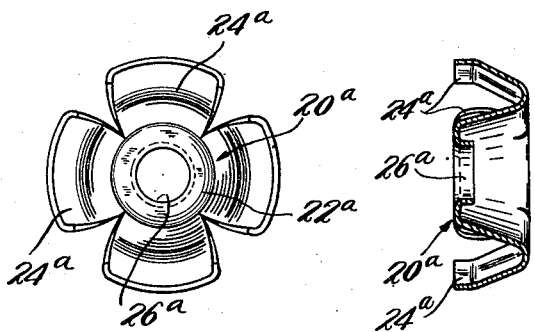
Figure 4:

In the drawing, wherein like reference characters designate like parts in the several views, Fig. 1 is a rear elevational view of the head of a rear view mirror and the adjacent end of a supporting arm or bracket to which the head is connected by my improved joint; Fig. 2 is a section on the line 2—2 of Fig. 1; Fig. 3 is an enlarged elevational view of the spring member appearing in the assembly of Fig. 2; Fig. 4 is a sectional detail, somewhat in the nature of a diagram, through a wing of the spring member, as indicated by the line a—a of Fig. 3, and through the wall of the cup against which the wing bears, the scale being further enlarged over that of Fig. 3, and Figs. 5 and 6 are, respectively, an elevational view of a modified form of the spring member, and a central section therethrough.

The mirror head, designated 1, is preferably fabricated of sheet metal; and permanently locked therein against a flat edge portion 2 by a turned over peripheral flange 3, are the mirror 5 and a backing 6, the latter consisting of a disc of suitable material. Inwardly of the portion 2, the head 1 is desirably dished to a slight depth, and near one side has an annular embossing 8, centrally of which there is formed a semi-spherical cup 10, having a relatively large axial opening 12. A support 15, in the nature of an arm or bracket, has a stud 17 projecting from an end thereof. This support also includes a circumferential concaved or undercut shoulder 19 at the base of said stud 17.

20 denotes a spring member of thin resilient sheet metal of relatively high temper that includes a hub 22, and wings 24 that extend radially from the hub. The hub is provided with a central aperture 26 about which the metal is curled over and inwardly on a rather liberal radius. In the assembly of the parts, before the mirror 5 and backing 6 are inserted into the head and locked in place by the contraction of the edge portion of the peripheral flange 3, the stud 17 is projected inwardly through the axial opening 12 of the cup 10 and through the hub 22 of the spring member 20. Beyond the hub, the end portion of the stud 17 is deformed or peened over to provide an abutment, as shown in Fig. 2, thereby to permanently attach the member 20 to the stud. When the parts are assembled in this manner, the wings 24 bear against the inner surface of the semi-spherical cup 10, and the outer surface of said cup, about the opening 12, engages the circumferential shoulder 19 of the support 15.

The bearing areas of the wings 24 are substantially complementary to the inner surface of the cup 10, while outwardly beyond said areas the edge portions of the wings recede from said surface, as clearly shown in the drawings, so as to insure smooth action of the joint when the mirror head is adjusted with respect to the support. In fact, I prefer to form the wings on a very slightly smaller radius than the cup, as indicated in Fig. 4, to enhance the aforesaid action. Also, by curling over the inner end of the hub 22 of the member 20 about the aperture 26, and deforming or peening over the inner end of the stud 17 to conform therewith, a sharp angle is avoided between the stud and the abutment provided by its deformed inner end. Such an angle, if permitted, would tend to promote cracking of the metal in its immediate region.

In Figs. 5 and 6 I have illustrated a modified form of the spring member, the same being designated 20ª. This second form is distinguished from the first, principally by the inclusion of four wings 24ª. The inner end of the hub 22ª about the aperture 26ª has the same formation as the corresponding part of the previously described member 20.

While I have shown, and prefer to use, a peened over portion at the inner end of the stud 17 as the abutment for holding the spring member 20 or 20ª on the stud and under compressed tension, it is obvious that a head may be formed on the stud, or other form of abutment employed, without departing from the spirit of the invention. In fact, the expedient of a more or less conventional screw connected abutment may be used with my improved spring member if desired, instead of the integral abutment shown and described.

Having thus described my invention, what I claim is:

1. A swivel joint connecting the head of a rear view mirror to a support, the head being characterized by a substantially semi-spherical cup having an axial opening, and the support being characterized by a stud of considerably lesser diameter than said opening projecting inwardly through the latter, and by an undercut circumferential shoulder at the base of the stud on which an exterior portion of the cup about said opening bears, a member of resilient sheet metal having a substantially central aperture through which said stud projects and beyond which the stud is deformed to provide an abutment thaat overhangs the surrounding portion of the member thereby to permanently attach said member to the stud, areas of said member outwardly of its central region being shaped substantially complementary to the inner surface of said cup and frictionally engaging the same, said member being compressed under tension when the parts are assembled as described.

2. A swivel joint according to claim 1, wherein the part of the member surrounding said central aperture gradually curves inwardly, and the portion of the abutment contacting said part conforms to the shape thereof.

3. A swivel joint connecting the head of a rear view mirror to a support, the head being characterized by a substantially semi-spherical cup having an axial opening, and the support being characterized by a stud of considerably lesser diameter than said opening projecting inwardly through the latter, and by an undercut circumferential shoulder at the base of the stud on which an exterior portion of the cup about said opening bears, and a member of resilient sheet metal having a hub through which said stud projects and beyond which the stud is deformed to provide an abutment that overhangs the end of the hub thereby to permanently attach said member to the stud, the member including a plurality of wings that radiate from the hub and bear against the inner surface of the cup, the areas of the wings that engage said surface being substantially complementary thereto, and said member being compressed under tension when the parts are assembled as described.

4. A swivel joint connecting the head of a rear view mirror to a support, the head being characterized by a substantially semi-spherical cup having an axial opening, and the support being characterized by a stud of considerably lesser diameter than said opening projecting inwardly through the latter, and by an undercut circumferential shoulder at the base of the stud on which the exterior portion of the cup about said opening bears, and a member of thin resilient sheet metal shaped throughout its central portion to provide a hollow boss-like hub having an aperture at one end about which the surrounding metal is curved over and inwardly, the hub of the member being engaged over the stud, and the end of the stud being deformed to provide an abutment that overhangs the end of the hub, the part of the abutment that engages the end of the hub conforming to the contour of the latter, the member including a plurality of wings that radiate from the hub and bear against the inner surface of the cup, said member being compressed under tension when the parts are assembled as described.

5. A swivel joint connecting the head of a rear view mirror to a support, the head being characterized by a substantially semi-spherical cup having an axial opening, and the support being characterized by a stud of considerably lesser diameter than said opening projected inwardly through the latter, and by an undercut circumferential shoulder at the base of the stud on which the exterior portion of the cup about said opening bears, and a member of thin relatively stiff resilient sheet metal having a hub through which said stud projects and beyond which the stud is deformed to provide an abutment that overhangs the end of the hub thereby to permanently attach said member to the stud, the member including a plurality of wings that radiate from the end of the hub opposite that aforesaid and bear against the inner surface of the cup, the portions of the wings surrounding their areas of contact with said surface receding from said surface, said member being compressed under tension when the parts are assembled as described.

6. A swivel joint according to claim 3, wherein said member is characterized by two substantially diametrically opposed wings.

7. A swivel joint according to claim 3, wherein said member is characterized by a number of wings in excess of two which are spaced apart circumferentially of the hub.

8. A swivel joint according to claim 3, wherein said member is characterized by four wings substantially equally spaced apart circumferentially of the hub.

9. A swivel joint according to claim 3, wherein said member is characterized by a number of wings in excess of two, the wings being substantially equally spaced apart circumferentially of the hub and the edge portions of the wings receding from the inner surface of the cup.

10. A swivel joint connecting the head of a rear view mirror to a support, the head being characterized by a substantially semi-spherical cup having an axial opening, and the support being characterized by a stud of considerably lesser diameter than said opening projecting inwardly through the latter, the support including also a circumferential shoulder at the base of the stud on which an exterior portion of the cup about said opening bears, a member of resilient sheet metal having a substantially central aperture through which the stud projects, the stud being provided beyond said member with an abutment that overhangs the surrounding portion of the member so as to attach said member to the stud, areas of said member outwardly of its central region being shaped substantially complementary to the inner surface of said cup and frictionally engaging the same, said member being compressed under tension when the parts are assembled as described.

11. A swivel joint according to claim 10, wherein the portion of said member surrounding the central aperture is formed to provide a hub against one end of which said abutment bears, the member including wings that radiate from the opposite end of the hub.

DAVID M. MORGENSTERN.

No references cited.